J. McALEAR.
VALVE.
APPLICATION FILED APR. 11, 1914.
1,148,602.
Patented Aug. 3, 1915.
3 SHEETS—SHEET 3.
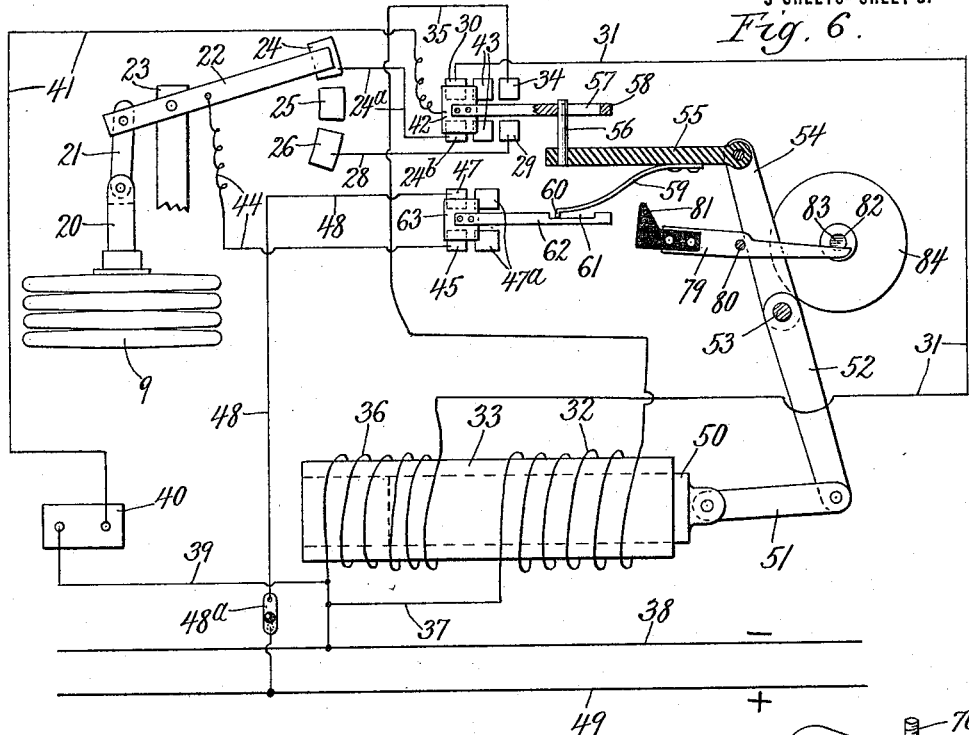
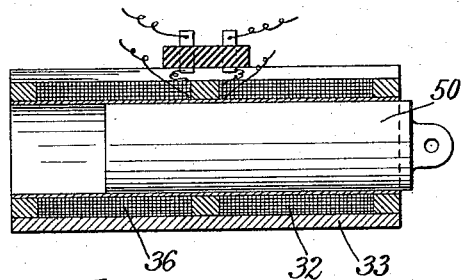
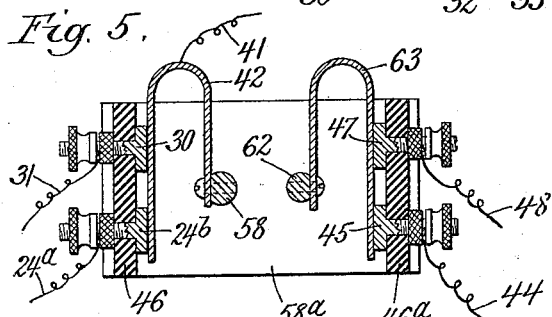
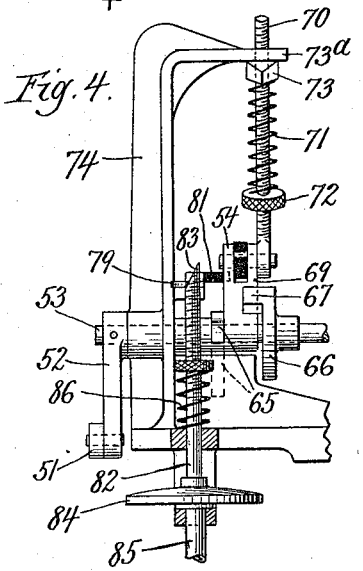
Witnesses,
Edward T. Wray.
Bessie S. Rice.
Inventor.
James McAlear.
by Parker & Carter
Attorneys.

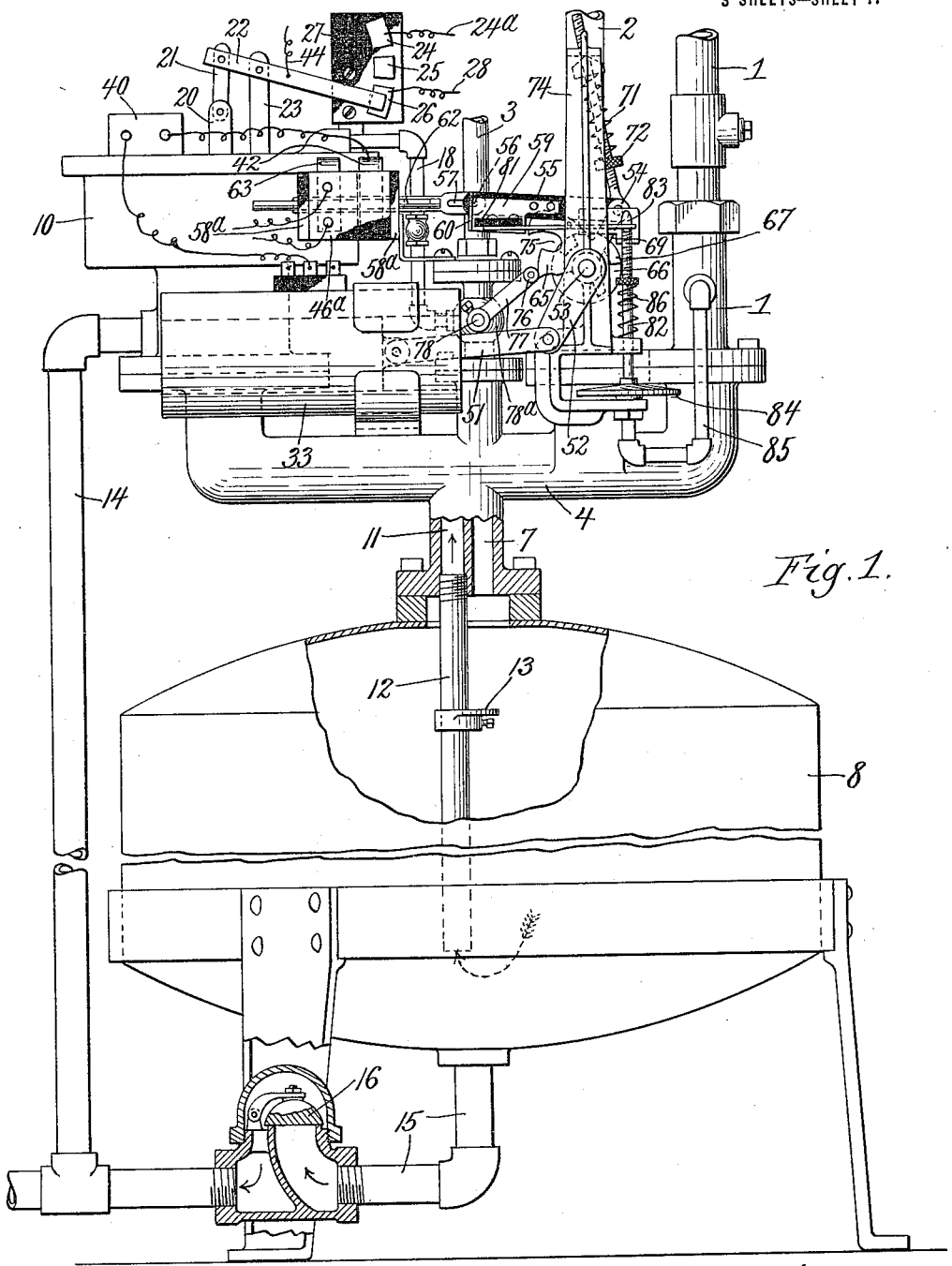

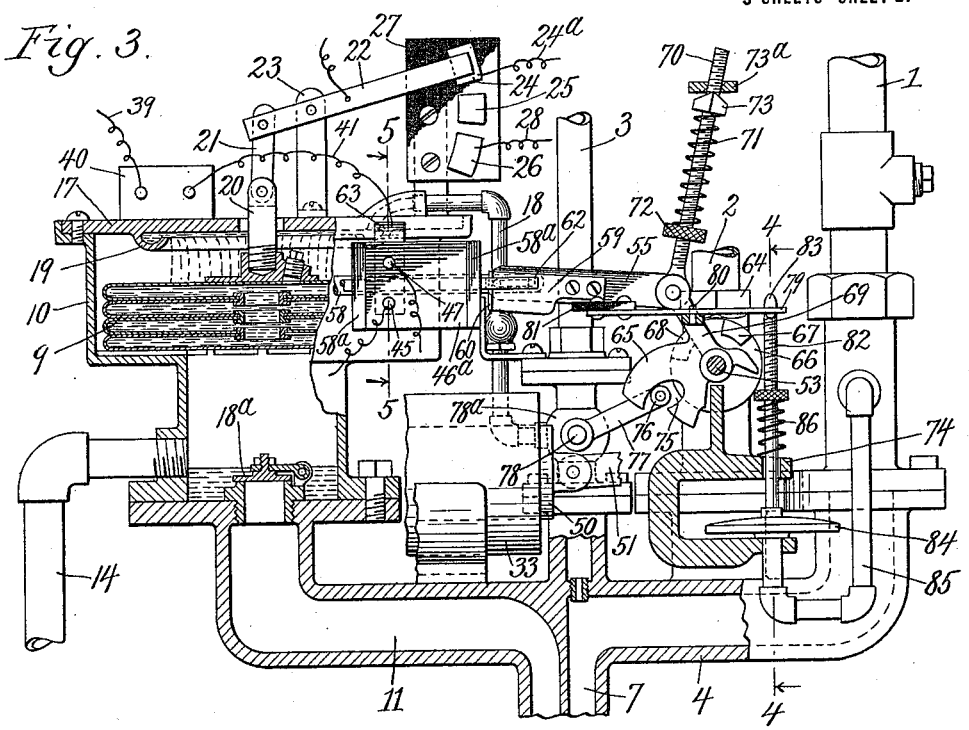

UNITED STATES PATENT OFFICE.

JAMES McALEAR, OF CHICAGO, ILLINOIS.

VALVE.

1,148,602.     Specification of Letters Patent.     Patented Aug. 3, 1915.

Application filed April 11, 1914. Serial No. 831,351.

*To all whom it may concern:*

Be it known that I, JAMES McALEAR, a citizen of the United States, residing at Chicago, in the county of Cook and State of Illinois, have invented a certain new and useful Improvement in Valves, of which the following is a specification.

This invention relates to devices for vacuum producing devices and has for its object to produce a new and improved device of this description.

The invention is illustrated in the accompanying drawings, wherein—

Figure 1 is a view of a device embodying the invention; Fig. 2 is a plan view of the device illustrated in Fig. 1; Fig. 3 is a sectional view taken on line 3—3 of Fig. 2; Fig. 4 is a sectional view taken on line 4—4 of Fig. 3; Fig. 5 is a sectional view taken on line 5—5 of Fig. 3; Fig. 6 is a diagrammatic view showing the electrical construction; Fig. 7 is a longitudinal sectional view through the solenoid.

Like numerals refer to like parts throughout the several figures.

In the construction shown, the apparatus is connected by pipe 1 with the device in connection with which it is used, such for example as a steam heating system. The pipe 2 connects the device with a source of steam supply and the pipe 3 with a source of water supply. A suitable base or supporting device 4 is provided, to which the various pipes are connected. The base 4 is provided with a passage-way 7, leading from the pipe 1 to the tank 8. The steam pipe 2 is also connected with the passage-way 7 and is thus connected with the tank 8. The water pipe 3 is also connected with the passage-way 7 and with the tank 8. Supported upon the base 4 is a thermostat shown as a bellows 9 which is supported in a casing 10.

The bellows may be made in any desired manner and contain a liquid which expands when heated so as to move or expand the bellows. The base 4 is provided with a passage-way 11 leading from the casing 10 to the pipe 12, which projects into the tank 8. This pipe is provided with a spraying part 13 arranged so that the water flowing through the passage-way 7 will strike it, thereby causing the water to be sprayed about the tank. A discharge pipe 14 leads from the casing 10 to any suitable point. As herein shown, this discharge pipe connects with a discharge pipe 15 leading from the bottom of the tank 8, and through which water is discharged from the tank. This pipe 15 is provided with a check valve 16. The casing 10 is provided with a suitable cover 17, said cover being provided with a connection 18 by means of which the casing is connected with the water pipe 3. The cover is provided on its inner face with a groove or trough shaped portion 19 preferably extending therearound so that the water from the pipe 18 may be scattered over the diaphragm or bellows to cool the expanding material therein and cause the bellows to contract or collapse. Associated with the steam and water pipes 2 and 3 are valves adapted to be alternately opened to alternately discharge steam and water into the tank 8. Some suitable mechanism is provided for controlling these valves. In the present case this mechanism is shown as an electrical apparatus controlled by the bellows or thermostat 9. Connected with the bellows is a pin 20. A check valve 18ᵃ at the mouth of the passage-way 11 prevents the water which flows on to the bellows from the pipe 18 from passing into the tank 8. A link 21 is connected with the pin 20 attached to the switch arm 22, pivoted to the standard 23 supported on the cover 17. The switch arm 22 moves over the electrical contacts 24, 25 and 26 mounted on the support 27. It will be seen that when the bellows is expanded the switch arm will be moved from contact 24 to contact 25 and contact 26 and that when the bellows is contracted, the switch arm will be moved back to contact 24. Contact 25 is an idle contact which prevents sparking. The contact 24 is connected by conductor 24ᵃ with a contact 24ᵇ mounted upon the support 46. The contact 26 is connected by conductor 28 with a contact 29 mounted upon the same support. Opposite the contact 24ᵇ on the same support is a contact 30 electrically disconnected from the contact 24ᵇ and connected by conductor 31 with the coil 36 of the solenoid 33 (see Fig. 6).

A contact 34 opposite the contact 29 on the same support and electrically disconnected therefrom is connected by conductor 35 with the coil 32 of the solenoid. The coil 32 of the solenoid is connected by conductor 37 with the conductor 38 of a supply circuit. The coil 32 is connected to the branch 38 of the supply circuit. A conductor 39 connected with the coils 32 and 37 is connected to a condenser 40, said condenser being connected by a conductor 41 with a brush or movable contact 42 associated with the contacts 24ᵇ, 29, 30 and 34, the condenser being connected across the line prevents sparking. Between the contacts 24ᵇ and 30 and 29 and 34 are the idle contacts 43 for the purpose of preventing sparking. The switch arm 22 is connected by a conductor 44 with a contact 45 mounted on a support 46ᵃ (see Fig. 2). Opposite the contact 45 is a contact 47 connected by a conductor 48 with the other branch 49 of the supply line. The solenoid 33 is provided with a core 50 which is connected by the link 51 with a crank 52 connected with a shaft 53 which controls the valve of the steam pipe 2 and water pipes 3 and 18. Connected with the shaft 53 is another crank 54 to which is attached a reciprocating arm 55. The arm 55 has a pin 56 which passes into a slot 57 in the switch controlling part 58 attached to the movable contact or switch 42. The reciprocating arm 55 is provided with a part 59 which is shown as a spring, the projecting end 60 of the part 59 working in a groove 61 in the reciprocating part 62, connected with a movable contact or switch 63 associated with the contacts 45 and 47. The parts 58 and 62 work in guides 58ᵃ (see Fig. 2) and a spring 62ᵃ on the part 62 which engages one of these guides and a stop 63ᵃ tends normally to return the movable contact or switch 63 to its initial position connecting contacts 45 and 47. Associated with contacts 45 and 47 are the dead contacts 47ᵃ upon which the movable contact 63 is moved. The shaft 53 controls a valve 64 which controls the passage of steam in the steam pipe 2. Loosely mounted on the shaft 53 is a valve controlling part 65. Associated with this part is a disk 66 fastened to the shaft 53 and provided with two projections 67 and 68. The controlling part 65 is provided with a projection 69 which projects between the parts 67 and 68 so that when the controlling part is moved a proper distance, it will move the disk 66 and rotate the valve shaft 53 so as to move the valve to open or close the connection between the steam pipe 2 and the passage-way 7 in the base 4. The part 69 is pivotally connected with a rod 70 (see Fig. 4) carrying a spring 71, which bears at one end against a nut 72 and at the other end against a movable compression part 73. This compression part engages the end 73ᵃ of a fixed standard 74 mounted upon the base 4 and through which the shaft 53 passes. The purpose of this rod and spring is to assist in throwing the parts to one side or the other toward their final position as the shaft is rocked back and forth to control the valve. The controlling piece 65 is provided with an enlarged slot 75, into which fits a pin 76 connected with an arm 77 attached to the valve stem 78 of a controlling valve 78ᵃ of the water pipes 3 and 18. This valve is arranged so that when moved in one direction the valve will be moved to permit water to pass into the tank 8 and will also let water pass through the pipe 18 to the bellows or diaphragm 9. The valves of the steam pipe 2 and the water pipe 3 are arranged so that they will open and close alternately, that is, when one is open the other will be closed and vice versa. They are also arranged so that in the intermediate position of the controlling device both valves are closed. The shaft 53 is moved back and forth by the core 50 of the solenoid 33. Associated with the part 59 is a controlling element 79 pivoted at 80 and provided with an end 81 adapted to be moved against the part 59 so as to move its ends 60 out of the groove 61, thereby releasing the part 62. The controlling element 79 engages a rod 82 which has a beveled end 83 (see Figs. 1, 2 and 6). This rod 82 is connected with a diaphragm in a casing 84 (see Fig. 1), the casing below the diaphragm is connected by a pipe 85 with the pipe 1, in which the vacuum is produced by the apparatus. As the vacuum in the pipe 1 increases, the pressure on the top of the diaphragm moves the rod 82 downwardly and the beveled face 83 being also moved downwardly so that the narrow portion of the rod 82 comes opposite the controlling element 79, permitting the end 81 of said element to move away from the part 59. This downward movement of the rod compresses the spring 86. As the vacuum in the pipe 1 decreases, the spring moves the rod up so that the wider part of the rod 82 comes opposite the part 79, moving said part so that the end 81 engages the part 59 and moves it out of engagement with the part 62.

I have shown in detail a particular construction embodying my invention, but it is of course evident that the parts may be varied in many particulars without departing from the spirit of my invention and I therefore do not limit myself to the particular construction shown.

The use and operation of my invention are as follows: When the controlling apparatus for the steam and water valves is in the position shown in Fig. 6, the device is ready to be operated if the current is turned on, as for example by means of the switch 48ᵃ. The current will then pass through the coil 32 of the solenoid, the circuit being traced as follows: From the branch 49 of the main line through conductor 48, switch 63 and conductor 44 to switch arm 22, thence by contact 24 and conductor 24ᵃ to contact 24ᵇ, thence by switch 42, contact 30 and conductor 31 to coil 36 and thence to branch 38 of the main circuit. The coil of the solenoid is then energized and the core 50 of the solenoid is moved to the left.

This moves the crank 52 and rocks the shaft 53 so as to open the steam valve. The crank 54 by means of parts 55 and 58 during this operation moves the switch 42 away from contacts 24^b and 30 and into contact with contacts 34 and 29. This breaks the circuit through the coil 32 and the parts stand at rest with the steam valve open. The steam now passes into the tank 8 and after filling the tank and driving out the air, said steam passes through passage-way 11, part of the steam entering the casing 10 and coming into contact with the bellows. The heat expands the liquid causing the bellows to expand, thus lifting the part 20 and causing the end of the switch arm 22 to move out of contact with contact 24 and into contact with contact 26. This establishes a circuit through the coil 32 of the solenoid, the circuit being traced as follows: From the main line conductor 49 through conductor 48, switch 63, conductor 44 to switch arm 22, thence through contact 26, conductor 28, contact 29 switch 42, contact 34 and conductor 35 to the coil 32 and thence to main line conductor 38. This energizes coil 32 and causes the core 50 of the solenoid to be moved to the right, to the position shown in Fig. 6. This movement rocks shaft 53 so as to close the steam valve and open the water valves. At the same time, switch 42 moves away from contacts 34 and 29 and engages contacts 30 and 26, thus breaking the circuit through coil 36. The water now passes from pipe 3 into the passage-way 7 and thence into the tank 8 and is sprayed about said tank, thereby condensing the steam therein. This produces a vacuum in the tank and causes the air to be drawn through pipe 1 from the heating system or other device in connection with which the apparatus is used. At the same time water passes through pipe 18, into the trough 19 of the casing of the bellows and is distributed so as to cool them. This causes the bellows to contract so as to move the switch arm 22 away from contact 26 and into contact with contact 24. The circuit is then again completed through coil 36. Since however there is a vacuum in the system at this time, the arm 79 is moved so that the end 81 does not engage the part 59. The slot 57 in the part 58 is somewhat longer than the groove 61 in the part 62, so that when the circuit is completed through the coil 36 and the arm 55 is moved, as before stated, the end 60 of the part 59 will engage the part 62 and move the switch 63 out of contact with the contacts 45 and 47 before contact 42 is moved. This breaks the circuit through the coil 36 between contacts 45 and 47 and stops the operation of the solenoid at an intermediate point where the steam valve and the water valves are all closed. The parts remain in this intermediate position until the vacuum in the pipe 1 decreases, so that the lowering of the pin 82 permits the part 79 to move against the part 59. This moves said part so that the end 60 is moved out of engagement with the part 62, whereupon the spring 62^a moves the switch 63 back into contact with contacts 45 and 47, again completing the circuit through coil 36. The core 50 of the solenoid is then moved from its intermediate position to its maximum position to the left, thereby opening the steam valve and moving switch 42 out of contact with contacts 24^b and 30 and into contact with contacts 29 and 34. The water is now again turned on and the operation above described repeated. It will thus be seen that this apparatus controls the water and steam valves as desired in response to the condition of the vacuum part of the system and that all valves are automatically closed and remain closed until there is a necessity for producing a further vacuum, whereupon the apparatus is again automatically started to open the steam valve and produce a further vacuum.

I claim:

1. A vacuum producing device comprising a tank, a vacuum connection leading to said tank, steam and water connections leading to said tank, valves for controlling said steam and water connections and an electromagnetic device connected with said valves so as to move them, a switch actuated by said electro-magnetic device for varying the circuits therethrough, a second switch for controlling the circuit through said electromagnetic device, a thermostatic device for controlling said latter switch, and a third switch controlled by the condition in said tank for stopping the electromagnetic device at an intermediate point to hold said valves closed and to again start the electromagnetic device when the vacuum reaches a pre-determined point.

2. A vacuum producing device comprising a tank, a vacuum connection leading to said tank, steam and water connections leading to said tank, valves for controlling said steam and water connections an electrically actuated device for controlling said valves and a thermostatic device for starting said electrically actuated device and a switch in circuit with said electrically actuated device for making and breaking said circuit, said switch jointly controlled by said electrically actuated device and the variation of the vacuum in said tank.

3. A vacuum producing device comprising a tank, a vacuum connection leading to said tank, steam and water connections leading to said tank, valves for controlling said steam and water connections and electrically actuated mechanism for controlling said valves and means responsive to variations in the vacuum produced by the apparatus for stopping said electrical actuating device at an intermediate point to hold the valves in the steam and water connections in their closed positions.

4. A vacuum producing device comprising a tank, a vacuum connection leading to said tank, steam and water connections leading to said tank, valves for controlling said steam and water connections and an electrical actuating device for controlling said valves and means responsive to variations in the vacuum produced by the apparatus for stopping said electrical actuating device at an intermediate point to hold the valves in their steam and water connections in their closed positions and means for automatically starting said electrical actuating device when the vacuum falls below a predetermined point so as to cause it to open the steam valve.

5. A vacuum producing device comprising a tank, a vacuum connection leading to said tank, steam and water connections leading to said tank, valves for controlling said steam and water connections, an electrically actuated device for controlling said valves, a controlling switch for said electrically actuated device and a thermostat device for operating said switch.

6. A vacuum producing device comprising a tank, a vacuum connection leading to said tank, steam and water connections leading to said tank, valves for controlling said steam and water connections, an electrically actuated device for controlling said valves, a controlling switch for said electrically actuated device and a thermostat device for operating said switch and means controlled by said steam and water valves for alternately admitting steam and water to said thermostat device.

7. A vacuum producing device comprising a tank, a vacuum connection leading to said tank, steam and water connections leading to said tank, valves for controlling said steam and water connections, an electrically actuating device for controlling said valves, comprising a solenoid adapted to be connected with the valves, a controlling switch for the solenoid, a thermostatic device for controlling said controlling switch and an intermediate electrical switch for modifying the action of the controlling switch.

8. A vacuum producing device comprising a tank, a vacuum connection leading to said tank, steam and water connections leading to said tank, valves for controlling said steam and water connections, an electrical actuating mechanism for alternately moving said valves to their open and closed positions and means for limiting said electrical actuating device to stop the two valves at their closed positions under predetermined conditions.

In testimony whereof, I affix my signature in the presence of two witnesses this 30th day of March, 1914.

JAMES McALEAR.

Witnesses:
BESSIE S. RICE,
MINNIE M. LINDENAU.

Copies of this patent may be obtained for five cents each, by addressing the "Commissioner of Patents. Washington, D. C."